United States Patent Office 2,977,156
Patented Mar. 28, 1961

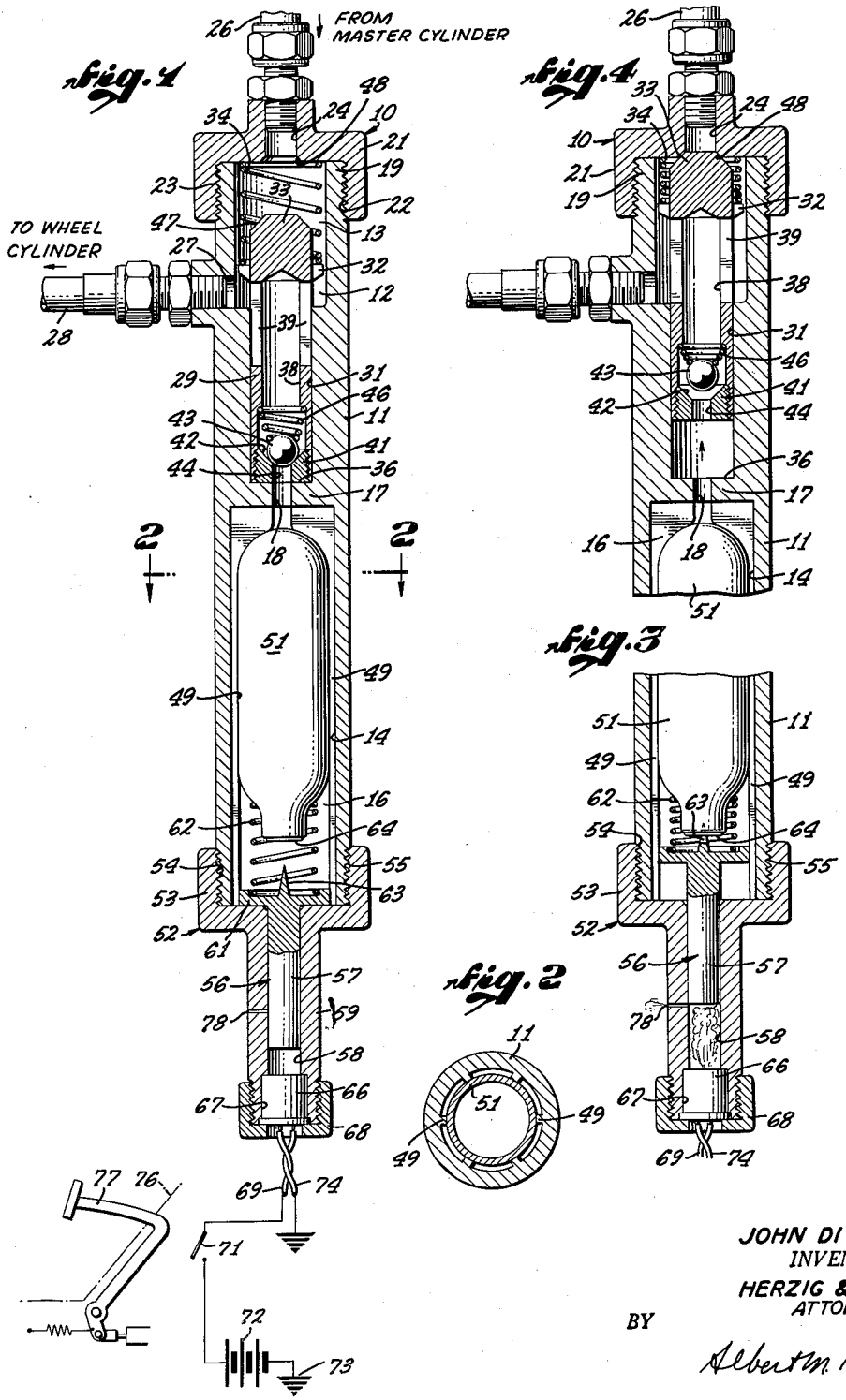

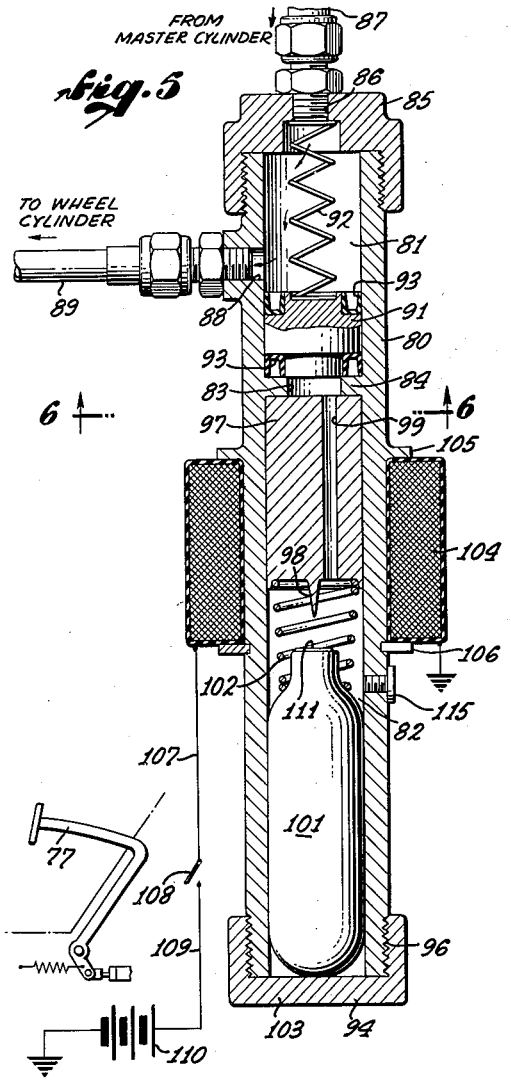
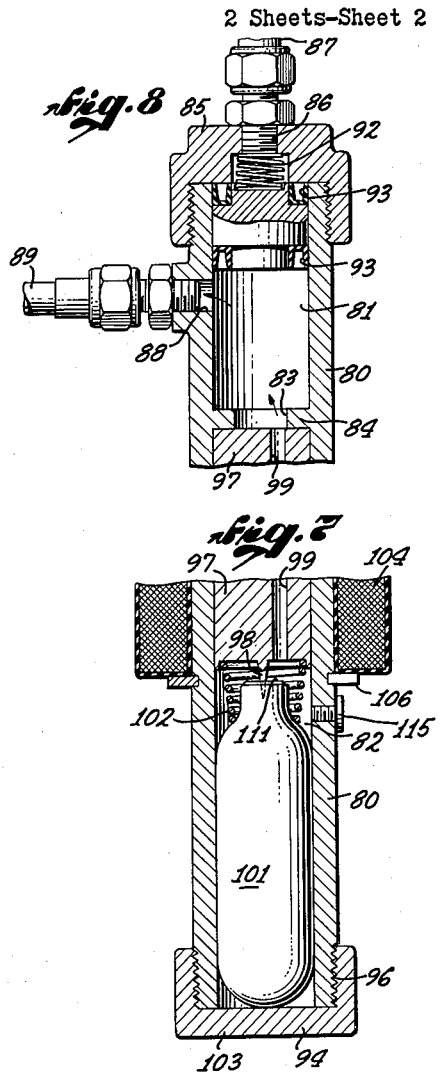
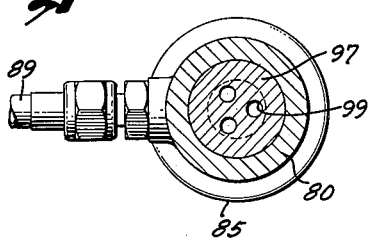

2,977,156

EMERGENCY BRAKE CONTROL

John Di Gioia, 708 N. Maclay St., San Fernando, Calif.

Filed June 27, 1957, Ser. No. 668,549

4 Claims. (Cl. 303—2)

This invention relates generally to an emergency brake control, and more particularly to a control and actuator which can be incorporated in the conventional pneumatic brake system of a vehicle for delivering an emergency and sudden supply of a pressurized gas to the wheel cylinders of the wheel vehicle in the event of a failure in the braking system.

Whereas the pneumatic brake control systems generally used in the heavier types of vehicles such as trucks, buses or the like, are generally designed to function efficiently under normal conditions, such systems have been known to fail because of faulty tubing which carries the pneumatic pressure to the wheel cylinders, or other faults which may arise in the system after long or hard usage of the brake system. The braking system on such heavy vehicles have been known to fail, especially when the vehicle has been braked as on a prolonged downgrade and a sudden or increased pressure is required when approaching a curve in the road. In these instances, there is rarely any indication until after the brakes have actually failed. Such heavy vehicles can cause considerable damage when out of control, resulting in very serious accidents, often involving other vehicles or property that are in the path of the uncontrolled vehicle.

It is therefore desirable, and among the objects of this invention, to provide a new and improved emergency brake control incorporated in a conventional pneumatic brake system, which provides a pressure means independent of the brake system of the vehicle available for selective and quick application to the wheel cylinders of said vehicle in the event of a failure of the conventional brake system.

It is another object of this invention to provide a new and improved emergency brake control which is easily installed in the conventional pneumatic brake systems, and which is readily operated.

A further object of this invention is to provide a new and improved emergency brake control which is economical to manufacture, capable of interchangeability of parts, and includes a pressurized cartridge which is readily installed and/or replaced.

It is a further object of this invention to provide a new and improved emergency brake control of the character described which provides an improved means for actuating said control when the convention brakes fail, yet which provides a safety feature to prevent accidental actuation thereof.

Still another object of this invention is to provide an emergency brake control, which can be installed in the brake system to supply emergency pressure to each wheel cylinder independently or collectively, yet insuring substantially equal pressure to each wheel cylinder of the vehicle.

It is a general object of this invention to provide a new and improved emergency brake control which overcomes disadvantages of prior devices and systems intended to accomplish generally similar purposes.

These and other objects will be more readily apparent in view of the following description of the drawings and appended claims.

In the drawings:

Figure 1 is a vertical sectional view of a preferred embodiment in accordance with this invention, including a schematic representation of the electric actuating circuit;

Figure 2 is a horizontal sectional view as taken on a line 2—2 of Figure 1;

Figure 3 is a fragmentary, vertical sectional view similar to the lower portion of Figure 1, illustrating the gas releasing means in a changed position;

Figure 4 is a fragmentary sectional view similar to the upper portion of Figure 1, illustrating the valve means incorporated therein in a changed position;

Figure 5 is a vertical sectional view, similar to Figure 1, illustrating another embodiment in accordance with this invention;

Figure 6 is a horizontal sectional view as taken on a line 6—6 of Figure 5;

Figure 7 is a fragmentary vertical sectional view, similar to the lower portion of Figure 5, showing the compressed gas releasing means in another position; and Figure 8 is a vertical sectional view, similar to the upper portion of Figure 5, showing the valve means of this embodiment in another position.

Referring more particularly to the drawings, there is shown in Figures 1 through 4, by way of illustration, but not of limitation, a preferred form of emergency brake control indicated generally by the numeral 10, comprising a body 11 having an upper bore 12 defining a valve chamber 13, and a lower bore 14 defining a pressurized gas storage chamber 15. The lower end of the chamber 13, and the upper end of the chamber 16, are defined by a transverse wall 17 of the body, having a passage 18 communicating between the chambers.

The upper open end 19 of the body 10 is provided with a cap 21 preferably removably fixed to the body as by internal threads 22 of the cap 21 in threaded engagement with the external threads 23 of the upper portion of the body. The cap 21 includes a port or passage 24 communicating between the chamber 13 and a conduit 26 connected to the master cylinder (not shown) of pneumatic brake system as commonly used in larger vehicles, such as trucks, buses or the like. A transverse port or passage 27 of the body communicates between the chamber 13 and a conduit 28 connected as to one of the wheel cylinders of the pneumatic brake system.

In a normal braking operation of the pneumatic brake system, the compressed air from the master cylinder is transmitted through the conduit 26, the passage 24, the upper portion of the chamber 13, the transverse passage 27, the conduit 28, and to the wheel cylinder (not shown). The emergency brake control 10 is preferably disposed in the pneumatic brake system by intersecting the conduit normally leading from the master cylinder to a wheel cylinder, and is preferably in closer proximity to the wheel cylinder, than to the master cylinder, thus decreasing the length of line which is liable to deteriorate, or be otherwise injured. Many of the failures in the conventional braking systems are in the conduits themselves, which connect the master cylinder to the wheel cylinders, therefore it is preferable that the emergency brake control 10 be located as close as is practically possible to the wheel cylinder to decrease the likelihood of failure from such a source.

A cylindrical valve body 29, is slidingly disposed in a reduced bore 31 of the chamber 13, and includes an annular shoulder 32 adjacent an upper closed end 33 thereof. The shoulder 32 supports a compression coiled spring 34 disposed in the chamber 13 between the cap 21 and the shoulder 32. The spring 34 urges the valve member 29 downwardly against a shoulder 36 formed by the wall 17 of the body 10.

The valve body 29 includes a longitudinal bore 38 communicating between the open bottom of the body 29, and transverse passages of the body 39. A hollow valve seat insert 41 is provided in the lower end of the valve body and includes a conical seat 42 for a ball valve 43. The ball valve 43 is urged on the seat 42 by a spring 46 to close a central passage 44 of the insert 41. The upper end 33 of the valve body preferably includes a conical outer surface 47 corresponding substantially in configuration to a countersunk seat 48 of the cap passage 24, to seat thereon and close off the passage or port 24 when the valve body 29 is extended in an upper position as will be hereinafter described.

The lower gas pressure chamber 16 includes a plurality of radial lands 49 to support a compressed gas cylinder or cartridge 51 in spaced relationship relative to the inner wall of the chamber 16, to provide longitudinal passages between the cartridge and the wall.

A lower cap 52 having an annular skirt 53 with an internal thread 54, threadingly engages external threads 55 of the lower portion of the body 10 to enclose the open end of the chamber 16 and provide a journal housing for a gas releasing means 56. The gas releasing means 56 includes a cylindrical body or piston 57 disposed in a bore 58 of an extension 59 of the cap 52. The piston 57 is provided with an enlarged head 61 forming a spring keeper for a coil spring 62 disposed between the spring keeper 61 and the cartridge 51. The spring 62 supports the cartridge within the chamber 16. A tapered pin 63 having a sharpened point extends upwardly from the enlarged portion 61 to form perforating means for rupturing a closure diaphragm 64 of the cartridge 51 as will be hereinafter explained.

An explosive charge 66 is disposed in an enlarged lower portion 67 of the bore 58, and is retained therein as by a threaded cap 68.

The explosive charge 66 is connected to an electrical circuit comprising a conductor 69, connected as to a normally open switch 71. The other pole of the switch 71 is connected to the battery 72 of the vehicle and thence to a ground indicated at 73. Another conductor 74 connects the explosive charge 66 to a ground connection or optionally to the ground side of the battery 72. The switch 71 is preferably located behind the fire wall 76 of the vehicle, spaced therefrom, to be actuated by the brake pedal arm 77 when the brake pedal is depressed beyond its normal extent of travel. In the event of a failure in the conventional brake system of a vehicle, the brake pedal arm 77 travels beyond its normal limit and closes the switch 71, detonating the explosive charge 66.

As best seen in Figure 3, when the explosive charge 66 is detonated, the discharge from the explosive charge 66 moves the piston 57 upwardly, as viewed in this figure, against the compression of the spring 62 to force the sharpened pin 63 through the closure diaphragm 64 of the cartridge 51, releasing the compressed gas therein into the chamber 16. In this piercing position, the piston 57 exposes a relief aperture to relieve the bore 58 of the compressive pressure caused by the explosive charge. The force of the compressed gas exhausting from the cartridge 51, together with the force of the spring 62, disengages the pin 63 from the cartridge 51 and returns the piston 57 to its normal position, as viewed in Figure 1.

As best seen in Figure 4, the compressed gas escapes from the chamber 16 through the passage 18 and into the chamber 13 to force the valve body 29 upwardly. The conical seat 47 of the head 33 seats on the conical seat 48, closing off the port 24 connected to the master cylinder.

When the valve body 29 has seated as described to close off the port 24, the pressure in the lower portion of the bore 31 increases, and unseats the ball valve 43 from the valve insert seat 42, allowing the compressed gas to enter the bore 38 of the valve body. The gas exhausts from the bore 38 through the transverse passages 39, enters the upper portion of the chamber 13, which is now closed from the port 24, and into the transverse passage 27. The passage 27 communicates with the wheel cylinder of the vehicle as through the conduit 28, to provide a compressed gas pressure on said wheel cylinders, applying the brakes on the vehicle.

If it is desired to recharge the brake system with another cartridge like 51, after the cause of the failure of the conventional brake system has been corrected, the closure means 52 is unthreaded from the body 10, the cartridge 51 is replaced by a freshly charged cartridge, and the closure member is then replaced. A very practical cartridge which can be used in this emergency brake control as described, is the readily available cartridges of $CO_2$, compressed air, or the like.

Referring to Figures 5 through 8, there is illustrated another embodiment of this invention, wherein a body 80 comprises an upper valve chamber 81 and a lower compressed gas storage chamber 82 interconnected as by a passage 83 of a transverse wall 84. The upper chamber 81 is provided with a closure means or cap 85 similar to the cap 21 of the first embodiment, having a passage or port 86 communicating with a conduit 87 connected to the master cylinder of the conventional pneumatic brake system of the vehicle. A transverse bore or port 88 of the body 80 communicates between the chamber 81 and a conduit 89 connected as to a wheel cylinder of the system.

Similarly to the first embodiment, during a normal braking operation, the compressed air from the master cylinder is directed through the conduit 87, the passage 86, the upper portion of the chamber 81, the passage 88, and the conduit 89 to the wheel cylinder.

A valve member 91 is slidingly disposed in the chamber 81, and is urged downwardly by a compression coil spring 92. The valve member 91 preferably includes a pair of cup seals 93 to prevent by-passing of the emergency compressed air around the outer periphery of the valve member when such is applied to the bottom thereof, as will be hereinafter described.

The lower chamber 82 is closed at the open bottom thereof by a closure member 94, secured to the body as by a threaded engagement 96. A gas releasing means in the form of an armature 97 is slidingly disposed in the upper portion of the chamber 82 and includes a piercing pin 98 depending therefrom. A plurality of longitudinal passages 99 are provided in the armature 97 for transmission of compressed gas therethrough. A cartridge 101, similar to the cartridge 51 described in the first embodiment is disposed in the lower portion of the chamber 82. A spring 102 extends between the lower end of the armature 97 and the upper end of the cartridge 101 to retain these members in the position shown in Figure 5 wherein the armature 97 abuts the wall 84 of the body 80 and the cartridge 101 abuts the transverse wall 103 of the closure member 94.

A coil 104 is disposed around the body 80 and may be retained thereon as by abutment of the coil against an outwardly extending annular shoulder 105 integral, or otherwise, of the body 80 and a split washer 106. The coil 104 is located adjacent the upper end of the chamber 82, but preferably extending below the lower edge of the armature 97 when the armature is in its normal upper position. The coil 104 is connected to an electric circuit similar to that described in connection with the first embodiment, wherein one lead of the coil is connected as by a conductor 107 to a switch 108. The other terminal of the switch 108 is connected as by a conductor 109 to a battery 110 of the vehicle which is normally grounded. As the brake pedal arm 77 is depressed beyond its normal operating limit, as caused by a failure in the conventional brake system, the arm 77 closes the switch 108 to flow a current through the coil 104 and create an axial magnetic flux.

The body 80 in this embodiment is preferably of a non-magnetic material, and the armature 97 is formed of a ferrous material, resulting in a magnetic attraction of the armature 97, by the coil 104, when the circuit is closed, to draw the armature 97 downwardly against the spring 102. The pin 98 pierces a closure member 111 of the cartridge 101, allowing the compressed gas within the cartridge to escape into the chamber 82. The force of the compressed gas, together with the force of the spring 102 ejects the armature 97 upwardly to its normal position shown in Figure 5. The compressed gas then escapes from the chamber 82 through the passages 99, the passage 83, and into the chamber 81.

As best seen in Figure 8, the compressed gas forces the valve member 91 upwardly against the cap 85 to close off the passage 86 communicating with the master cylinder. In this upper position, the valve member 91 exposes the transverse body passage 88 to the compressed gas within the chamber 81, allowing the compressed gas to enter the conduit 89 and act upon the wheel cylinder actuating the brakes of the vehicle.

The cartridge 101 may be easily removed after discharge, similarly as in the first embodiment, by removing the lower cap 94, whereby a charged cartridge like 101 may be substituted. A bleed valve 115 is preferably provided in the body 80 to facilitate recharging of the pneumatic system after such replacement.

In general, this invention includes a chambered body, the first chamber forming a communication between the master cylinder and the wheel cylinder of a conventional pneumatic brake system of a vehicle, and includes a valve member which is slidingly disposed therein. A second chamber of the body contains a storage tank such as a cartridge of compressed gas and a means for piercing and releasing the compressed gas from the storage tank. In the event that the normal operation of the brake system is disrupted as by a failure in the system, provision is made for the brake pedal to be depressed beyond its normal extent to actuate a switch, and close an electric circuit to actuate the gas releasing means. The released compressed gas acts upon the valve member of the upper chamber to close off the passage leading to the master cylinder, and opens a passage leading to the wheel cylinder to admit compressed gas therethrough, and thereby actuate the wheel cylinders ot apply the brakes and stop the vehicle.

It is to be understood that various modifications may be substituted without departing from the spirit of this invention. As an example, the emergency brake control may be formed by combining the upper chamber and its associated valve of the first embodiment with the lower chamber and its associated mechanism to form a third embodiment, or by combining the upper chamber and its valve member of the second embodiment with the lower chamber and its relative mechanism of the first embodiment to form another embodiment.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What I claim is:

1. An emergency brake control comprising: a body having a pair of cylindrical chambers and a passage communicating between said chambers, means defining an axial port in said body communicating between one of said chambers and the exterior of said body and adapted to be connected to a pneumatic master cylinder, means defining a radial port in said body and communicating between said one of said chambers and the exterior of said body and adapted to be connected to a wheel cylinder, a valve means slidably disposed in said one of said chambers for axial movement therein and including a body having a closed end, transverse openings, an open end and an axial bore communicating between said transverse openings and said open end, a valve seat disposed in said valve body adjacent said open end and having a spring urged valve element normally seated thereon, means for storing compressed gas in the other of said chambers, means for releasing said gas from said storing means, and electrically operated actuating means for selectively actuating said releasing means, whereby said gas enters said other of said chambers, through said passage and into said one of said chambers, whereby said radial port is in communication with said axial port when said valve means is in an inactive position, said valve means being adapted to be extended by said compressed gas into a position wherein said axial port is closed off by said closed end of said valve means, said transverse openings are in register with said radial port, and said spring biased valve element is unseated after said closed end closes said axial port for communication of the compressed gas with said radial port.

2. An emergency brake control in accordance with claim 1, wherein said actuating means includes an explosive means, said releasing means includes a depending piston means and said body includes a third chamber, said depending piston means being slidably disposed in said third chamber for axial movement therein, and said explosive means being adapted to be selectively detonated by an electric circuit for extending said depending piston means and thereby said releasing means into engagement with said gas storing means for releasing said compressed gas.

3. An emergency brake control comprising: a body having a pair of chambers, a passage connecting said chambers, a valve means disposed in the first of said chambers for axial sliding movement therein, a first port in said first chamber adapted to be connected to a pneumatic master cylinder, a second port in said first chamber adapted to be connected to a wheel cylinder of an automotive brake system, said ports being in communication through said first chamber for transmitting compressed air therethrough when said valve means is in a normally inactive position, means for storing a compressed gas in the other of said chambers, means for releasing the compressed gas adjacent said gas storing means, and electrically operable actuating means operatively associated with said releasing means for selectively actuating the releasing means to release the gas through said passage into said first chamber and extend said valve means into a position whereby said first port is closed off by said valve member, and said second port communicates with said gas storing means, spring means for urging said valve means into the inactive position, said valve means including a body having a closed end, transverse openings, an open end and an axial bore communicating between said transverse openings and said open end, a valve seat disposed in said body adjacent said open end and having a spring urged valve element normally seated thereon, said closed end adapted to close said first port, said transverse openings being in register with said second port, and said spring urged valve element being unseated when said valve means is extended by said compressed gas, said closed end closing said first port before said valve element is unseated.

4. An emergency brake control comprising: a body having a pair of chambers, a passage connecting said chambers, a valve means disposed in the first of said chambers for axial sliding movement therein, a first port in said first chamber adapted to be connected to a pneumatic master cylinder, a second port in said first chamber adapted to be connected to a wheel cylinder of an automotive brake system, said ports being in communication through said first chamber for transmitting compressed air therethrough when said valve means is in a normally inactive position, means for storing a compressed gas in the other of said chambers, means for releasing the compressed gas adjacent said gas storing means, and electrically operable actuating means operatively associated with said releasing means for selectively actuating the releasing means to release the gas through said passage into said first chamber and extend said valve means into a position whereby said first port is closed off by said valve member, and said second port communicates with said gas storing means, spring means for urging said valve means into the inactive position, said actuating means including an explosive means, said releasing means includes a depending piston means, and said body includes a third chamber, said depending piston means being disposed in said third chamber for axial sliding movement, and said explosive means being adapted to be selectively detonated by an electric circuit for extending said depending piston means and thereby said releasing means into engagemet with said gas storing means for releasing said compressed gas.

References Cited in the file of this patent

UNITED STATES PATENTS

| | | |
|---|---|---|
| 2,674,852 | Olman | Apr. 13, 1954 |
| 2,776,734 | Hackett | Jan. 8, 1957 |
| 2,814,363 | Phillips | Nov. 26, 1957 |